United States Patent
Matta et al.

(10) Patent No.: US 7,163,343 B2
(45) Date of Patent: Jan. 16, 2007

(54) OPTICAL MODULE ALIGNED AFTER ASSEMBLY

(75) Inventors: Farid Matta, Los Altos, CA (US); Storrs T. Hoen, Brisbane, CA (US); Ronald T. Kaneshiro, Los Altos, CA (US); Tak Kai Wang, Saratoga, CA (US)

(73) Assignee: Avago Technologies Fiber IP (Singapore) IP Pte. Ltd., Singapore (SG)

( * ) Notice: Subject to any disclaimer, the term of this patent is extended or adjusted under 35 U.S.C. 154(b) by 54 days.

(21) Appl. No.: 10/774,461

(22) Filed: Feb. 10, 2004

(65) Prior Publication Data

US 2005/0175298 A1   Aug. 11, 2005

(51) Int. Cl.
*G02B 6/42* (2006.01)
(52) U.S. Cl. ............... 385/88; 385/90; 385/91; 385/93
(58) Field of Classification Search ........... 385/52, 385/90–93
See application file for complete search history.

(56) References Cited

U.S. PATENT DOCUMENTS

| | | | | |
|---|---|---|---|---|
| 5,870,517 A | * | 2/1999 | Wyland | 385/88 |
| 6,086,776 A | * | 7/2000 | Maynard | 216/24 |
| 6,450,702 B1 | * | 9/2002 | Komoriya et al. | 385/90 |
| 6,688,783 B1 | * | 2/2004 | Janosik et al. | 385/93 |
| 6,748,141 B1 | * | 6/2004 | Kennedy et al. | 385/49 |
| 6,829,400 B1 | * | 12/2004 | Nakano et al. | 385/16 |
| 2002/0071638 A1 | * | 6/2002 | Musk | 385/52 |
| 2003/0063844 A1 | * | 4/2003 | Caracci et al. | 385/24 |
| 2003/0185516 A1 | * | 10/2003 | Kennedy et al. | 385/49 |
| 2004/0052468 A1 | * | 3/2004 | Pham et al. | 385/52 |
| 2005/0025430 A1 | * | 2/2005 | Bhagavatula et al. | 385/52 |
| 2005/0111794 A1 | * | 5/2005 | Wang et al. | 385/52 |

* cited by examiner

*Primary Examiner*—Michelle Connelly-Cushwa

(57) ABSTRACT

An optical module includes an active optical component, an optical fiber, a beam shaping optical component and a positioning device. The optical fiber is arranged with respect to the active optical component to be capable of propagating light along an optical path between the active optical component and the optical fiber. The beam shaping optical component is located in the optical path between the optical fiber and the active optical component. The positioning device is for moving either the beam shaping optical component with respect to the optical fiber, the beam shaping optical component with respect to the active optical component, or the active optical component with respect to the optical fiber, or a combination.

9 Claims, 10 Drawing Sheets

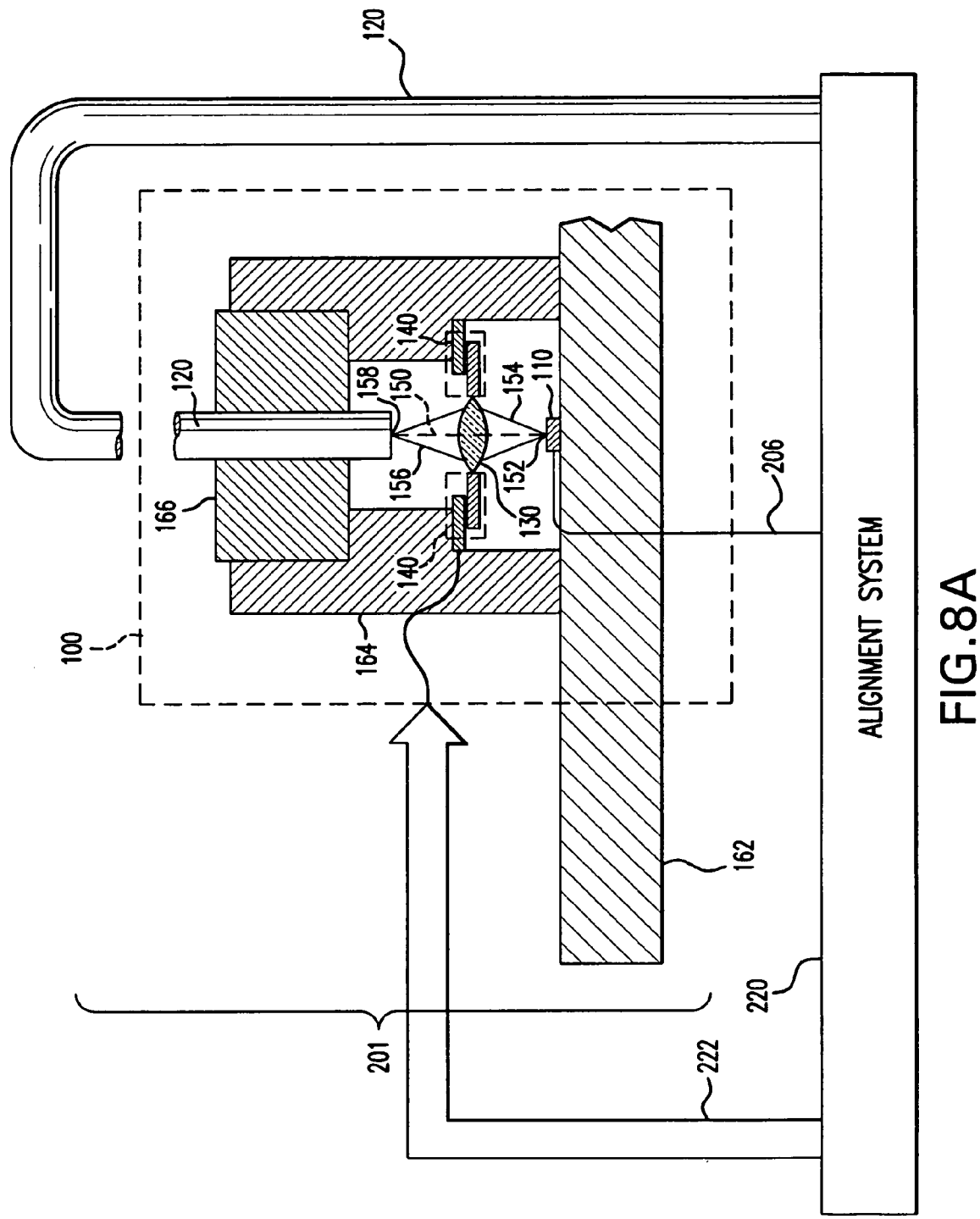

OPTICAL MODULE ALIGNED AFTER ASSEMBLY

BACKGROUND OF THE INVENTION

1. Field of the Invention

The present invention relates to optical to electrical and electrical to optical converter modules. In particular, the invention relates to a module that is aligned after assembly.

2. Description of Related Art

Optical transmitter modules that convert electrical signals in wires into optical signals in fibers are known. Optical receiver modules that convert optical signals in fibers into electrical signals in wires are known. Optical transceiver modules that both convert electrical signals in wires into optical signals in fibers and convert optical signals in fibers into electrical signals in wires are known. Alignment architectures for these known modules may be regarded in two categories: fiber in line with the optical source/detector and fiber perpendicular with the optical source/detector. The optical source is generally some kind of laser, and the optical detector is typically a photodiode or phototransistor, or equivalent. The optical alignment of the fiber with the optical source/detector for these modules is exceedingly demanding, particularly for singlemode fibers in which the fiber core is less than 10 µm in diameter and the acceptance angle is narrow.

In known assembly processes for a transmitting module, the module assembly process is interrupted for "in-line" alignment. During the alignment procedure the module's laser is turned on, and the fiber output is connected to a power meter. The parts are moved either manually or robotically to achieve maximum coupling of the light into the fiber, then the components are permanently fixed in place. Then, the module assembly process is continued to provide the finished module. At the end of the module's assembly process, the laser is again turned on and the module's fiber is connected to a power meter. Similar assembly practices apply to optical receiver and transceiver modules.

This assembly practice is referred to as the in-line alignment process. The in-line alignment process requires that electrical and optical connections from test equipment to the module under assembly be made before assembly is complete. The in-line alignment process is relatively costly. What is needed is a way to defer alignment until assembly is complete, and the module is in final test. Then, the alignment should be fixed in position.

Furthermore, after the module has been assembled and the alignment fixed in position, the components of the module may drift out of alignment due to aging of the structure and bonding materials, or due the temporary or permanent degradation from thermal expansion, shock or vibration. What is needed is a way to realign the module components after the module assembly is complete and after the module had been initially aligned and the alignment fixed in position. Then, the alignment should be re-fixed in position.

SUMMARY OF THE INVENTION

The invention improves the state of the art by providing a module that can be assembled and then aligned.

An optical module includes an active optical component, an optical fiber, a beam shaping optical component and a positioning device. The optical fiber is arranged with respect to the active optical component to be capable of propagating light along an optical path between the active optical component and the optical fiber. The beam shaping optical component is located in the optical path between the optical fiber and the active optical component. The positioning device is for moving either the beam shaping optical component with respect to the optical fiber, the beam shaping optical component with respect to the active optical component, or the active optical component with respect to the optical fiber, or a combination.

A method of making an optical module includes assembling an active optical component, an optical fiber, a beam shaping optical component and a positioning device. The assembly is such that the optical fiber is arranged with respect to the active optical component to be capable of propagating light along an optical path between the active optical component and the optical fiber, the beam shaping optical component is located in the optical path between the optical fiber and the active optical component, and the positioning device capable of moving one of a pair of elements with respect to the other before fixation. The pair of elements includes either (a) the beam shaping optical component and the optical fiber, (b) the beam shaping optical component and the active optical component and (c) or active optical component with respect to the optical fiber. Then, after the assembly the method further includes rendering the positioning device incapable of moving the one of the pair of elements with respect to the other after fixation.

BRIEF DESCRIPTION OF DRAWINGS

The invention will be described in detail in the following description of preferred embodiments with reference to the following figures wherein:

FIG. 8A is a schematic diagram of an alternative embodiment of an optical module that includes a fixation film on facing surfaces of a positioning device according to the present invention.

DETAILED DESCRIPTION OF PREFERRED EMBODIMENTS

Figure 1:
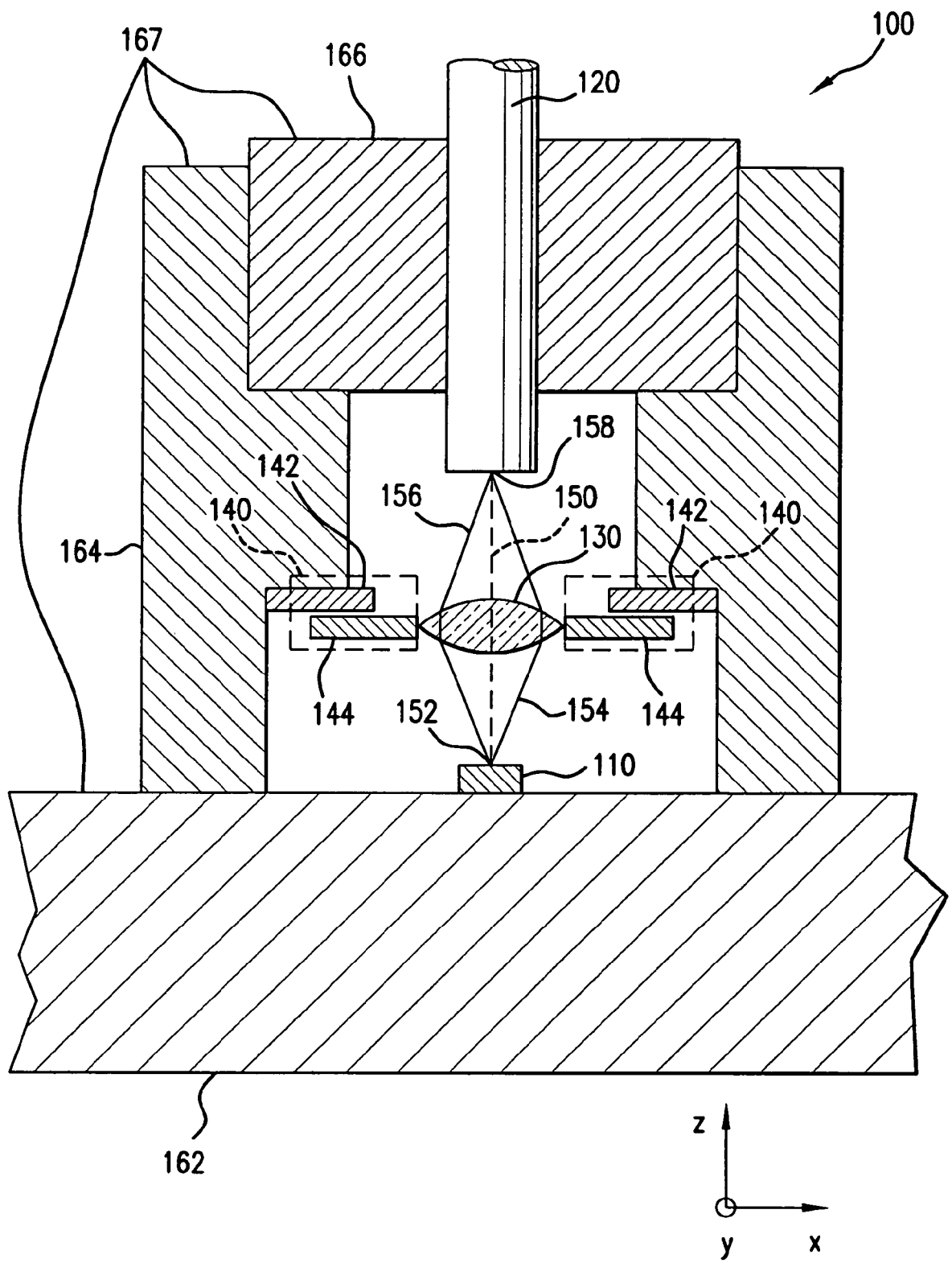
FIGS. 1–7 are section views of alternative embodiments of an optical module according the present invention.

In FIG. 1, an optical module 100 according to an embodiment of the present invention includes an active optical component 110 and an optical fiber 120 arranged with respect to the active optical component to be capable of propagating light along an optical path 150 between the active optical component and the optical fiber. The optical module 100 further includes a beam shaping optical component (depicted in FIG. 1 as lens 130) located in the optical path between the optical fiber and the active optical component, and a positioning device 140 for moving either: (i) the beam shaping optical component with respect to the optical fiber, or (ii) the beam shaping optical component with respect to the active optical component.

Figure 2:
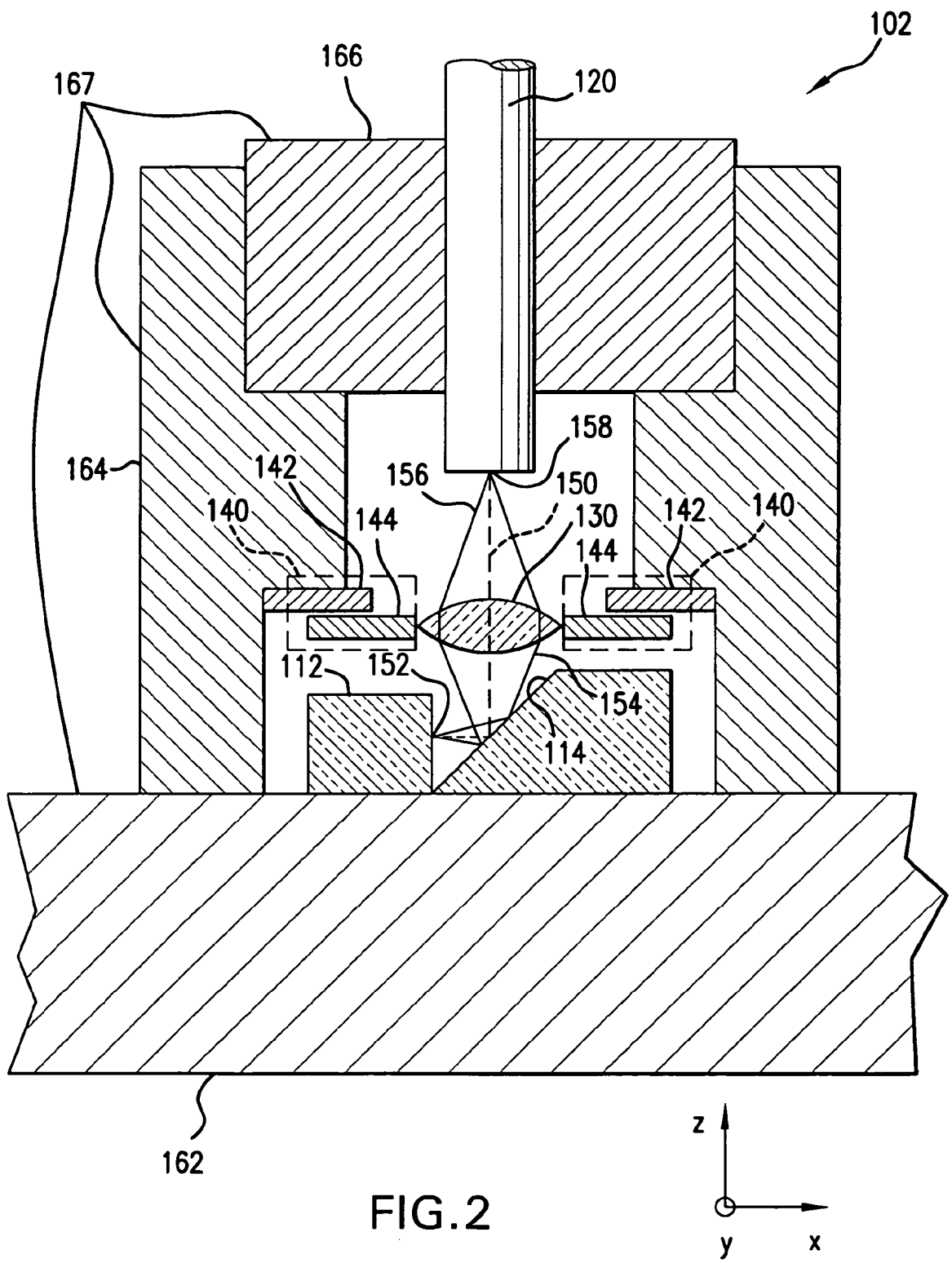

In optical transmitter modules, the active optical component 110 includes a laser, either an edge emitting laser or a surface emitting laser such as a vertical cavity surface emitting laser (known in the art as a VCSEL). The laser depicted in FIG. 1 is a VCSEL, and the laser depicted in FIG. 2 is an edge emitting laser. The laser produces, at spot 152, an expanding light beam 154 that is focused by the beam shaping optical component, i.e., a lens 130, into a focused light beam 156 that is incident on a spot 158 on the end of fiber 120. In optical receiver modules, the active optical component 110 includes an optical detector, typically a photodiode or a phototransistor. The optical fiber 120 emits light from a spot 158 as an expanding light beam 156 that is focused by the beam shaping optical component, i.e., lens 130, into focused beam 154 that is incident on spot 152 of the optical detector. Optical transceiver modules include both an optical transmitter module and an optical receiver module.

In FIG. 2, an optical module 102 uses a folded optics arrangement. Optical module 102 includes substantially the same elements as included in FIG. 1, except that optical module 102 includes mirror 114 in the optical path between the beam shaping optical component 130 and the active optical component 110. The optical path 150 extends between the optical fiber 120 and the active optical component 110, but is reflected at mirror 114. Mirror 114 establishes the folded optical path 150. Other folded optical arrangements may be used as well. For example, with the inclusion of additional mirrors, or prisms, the optical path will bend more times than just once at the mirror 114. Other optical arrangements may be used as well. For example, beam shaping can be achieved by parabolic mirrors instead of a lens.

FIGS. 1 and 2 depict a substrate 162, an armature 164 mounted on the substrate, and a bushing 166 mounted in a recess of the armature. The bushing firmly hold the optical fiber 120 and defines the position of optical fiber 120 with respect to substrate 162. The substrate 162, the armature 164 and the bushing 166 collectively constitute a frame 167. The purpose of the frame is to hold the active optical component 110, the optical fiber 120, the beam shaping optical component 130 and the positioning device 140 in the arrangement described herein.

In an example of an embodiment of an optical transmitter module, an optical receiver module, or an optical transceiver module, the optical module 100 or 102 includes a frame 167 to which the optical fiber 120 and active optical component 110 are affixed. The positioning device 140 includes a stator 142 affixed to the frame and translator 144 affixed to lens 130. The stator 142 and the translator 144 collectively constitute a micro-machined movable stage affixed between the frame and the beam shaping optical component 130. The positioning device 140 is operable to move the beam shaping optical component, i.e., lens 130, linearly in one direction, linearly in two orthogonal directions, or possibly in three directions with respect to the frame. FIGS. 1 and 2 depict three orthogonal directions X, Y and Z. In FIGS. 1 and 2, the positioning device 140 is operable to move the beam shaping optical component 130 within a plane defined to be everywhere orthogonal to the Z direction.

In the operation of the optical module depicted in FIG. 1 or 2, the positioning device 140 moves lens 130 with respect to the frame in a plane parallel to the surface of substrate 162, i.e., orthogonal to the Z direction. In embodiments in which the optical module 100 (or 102) is a transmitter module, the optical path 150 will tilt as lens 130 is moved with respect to the frame since the active optical component 110 of a transmitter module is a laser affixed to the substrate 162. In this way, the location of spot 158 at which light is incident on the end of optical fiber 120 can be adjusted by the positioning device 140. The positioning device 140 enables the spot 158 to be moved across the end of optical fiber 120 until alignment is achieved as indicated by good coupling between the electrical signal into the laser and the optical signal out of the optical fiber.

In embodiments in which the optical module 100 (or 102) is a receiver module, the optical path 150 will tilt as lens 130 is moved with respect to frame 167 since the emitting spot 158 on the end of fiber 120 is held firmly with respect to the frame by bushing 166. In this way, the location of spot 152 at which light is incident on the optical detector can be adjusted by the positioning device 140. The positioning device 140 enables the spot 152 to be moved across the detector until alignment is achieved as indicated by good coupling between the optical signal into the fiber 120 and the electrical signal generated by the detector.

Figure 3:
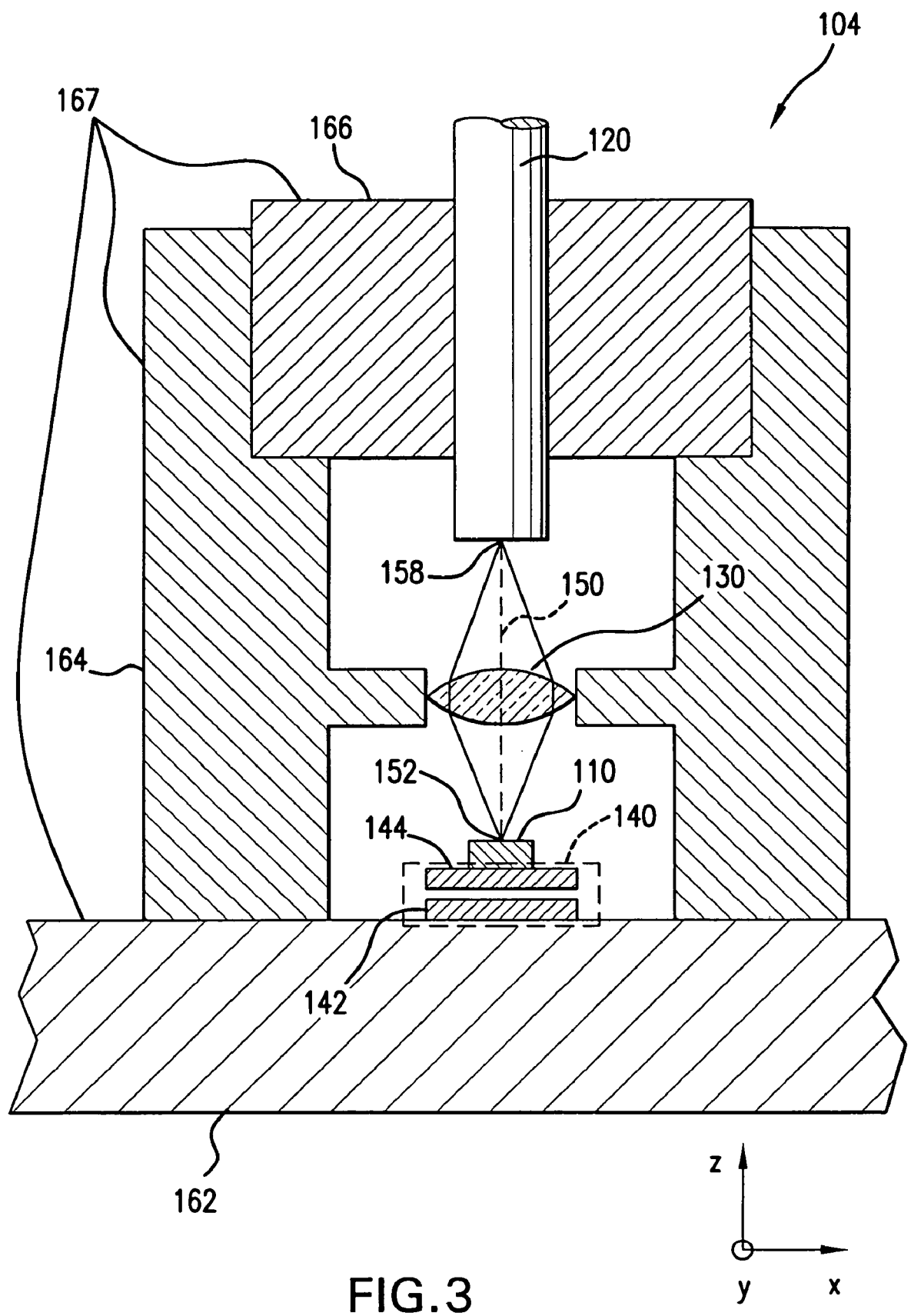

In another example depicted in FIG. 3 of an embodiment of an optical transmitter module, an optical receiver module, or an optical transceiver module, the optical module 104 includes a frame to which the optical fiber 120 and the beam shaping optical component, i.e. lens 130, are affixed. The positioning device 140 includes a stator 142 affixed to the substrate 162 and a translator 144 affixed to active optical component 110. The stator 142 and the translator 144 collectively constitute a micro-machined movable stage affixed between the frame 167 and the active optical component 110. The positioning device is operable to move the active optical component 110 linearly in one direction orthogonal to the Z direction, linearly in two orthogonal directions, each orthogonal to the Z direction, or possibly in three directions with respect to the frame 167.

In the operation of the optical module depicted in FIG. 3, the positioning device 140 moves the active optical component 110 with respect to the frame 167 in a plane parallel to the surface of substrate 162. In embodiments in which the optical module 104 is a transmitter module, the optical path 150 will tilt as the active optical component 110 is moved in a plane parallel to a surface of substrate 162 since lens 130 is fixed to frame 167. In this way, the location of spot 158 at which light is incident on the end of optical fiber 120 can be adjusted by the positioning device 140. The positioning device 140 enables the spot 158 to be moved across the end of optical fiber 120 until alignment is achieved as indicated by good coupling between the electrical signal into the laser and the optical signal out of the optical fiber.

In embodiments in which the optical module 104 is a receiver module, the optical path 150 will remain stable with respect to frame 167 as the detector 110 is moved with respect to the frame since lens 130 is fixed to the frame and the emitting spot 158 on the end of fiber 120 is held firmly in place with respect to the frame by bushing 166. In this way, the location of spot 152 at which light is incident on the optical detector is stable as the location of the optical detector is adjusted by the positioning device 140. The positioning device 140 enables the detector to be moved across the location of spot 152 until alignment is achieved as indicated by good coupling between the optical signal into the fiber 120 and the electrical signal generated by the detector.

Figure 4:
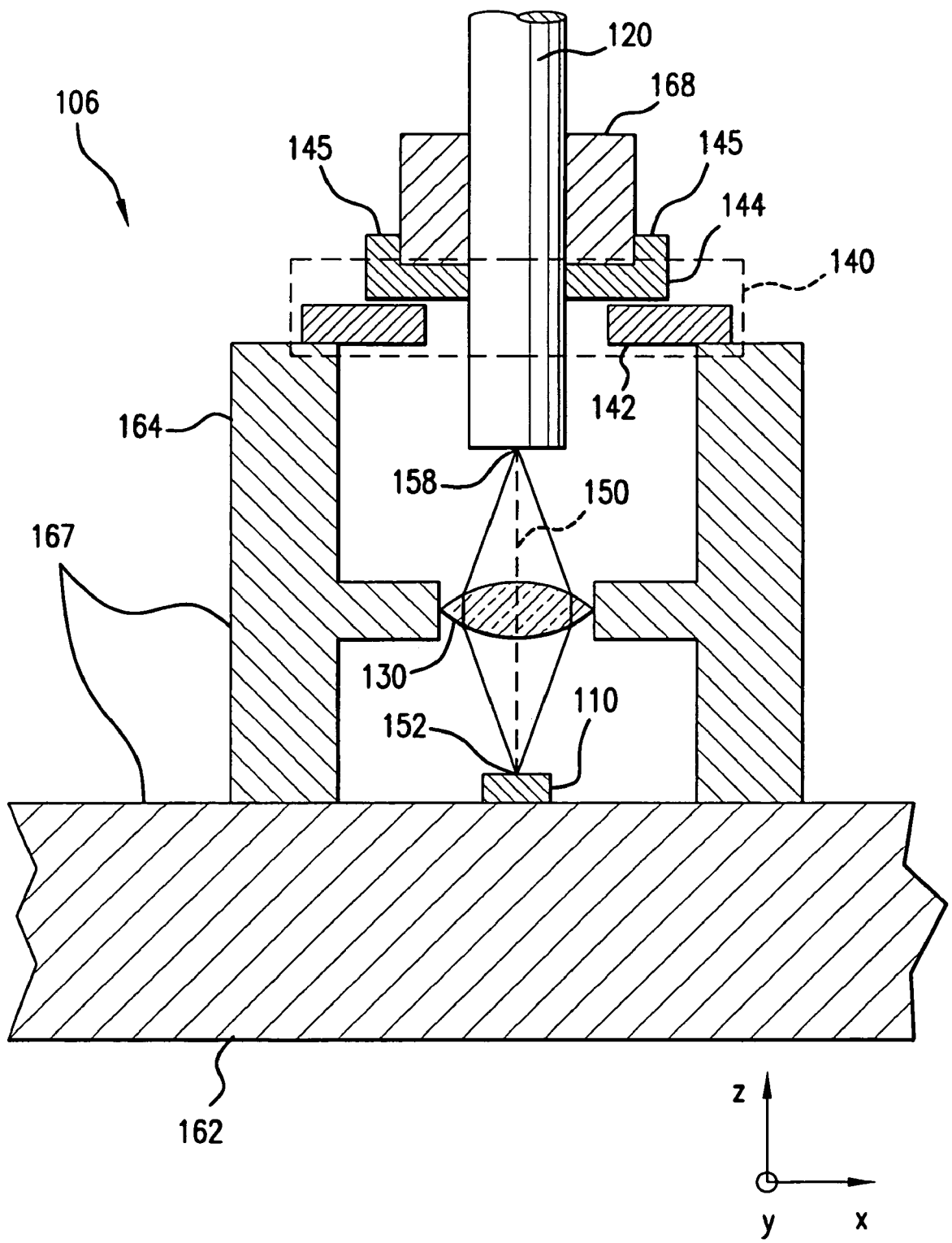

In yet another example depicted in FIG. 4 of the embodiment of an optical transmitter module, an optical receiver module, or an optical transceiver module, the optical module 106 includes a substrate 162 and an armature 164 (that are collectively referred to as a frame 167) to which the beam shaping optical component, i.e. lens 130, and active optical component 110 are affixed. The positioning device 140 includes a stator 142 affixed to the armature 164 and a translator 144 having a raised boss 145. A bushing 168 is pressed between the boss 145 on the translator 144 and the optical fiber 120 to hold the fiber 120 firmly and define its position with respect to translator 144. The stator 142 and the translator 144 collectively constitute a micro-machined movable stage affixed between the frame 167 and the optical fiber 120. The positioning device 140 is operable to move the optical fiber 120 linearly in one direction orthogonal to the Z direction, linearly in two orthogonal directions each being orthogonal to the Z direction, or possibly in three directions with respect to the frame 167.

In the operation of the optical module depicted in FIG. 4, the positioning device 140 moves the optical fiber 120 with respect to the frame 167 in a plane parallel to a surface of substrate 162. In embodiments in which the optical module 106 is a transmitter module, the optical path 150 will remain stable with respect to the frame 167 as the optical fiber 120 is moved since both lens 130 and laser 110 are fixed to the frame. In this way, the location of the spot 158 at which light is incident on the end of optical fiber 120 remains fixed in space and the end of optical fiber 120 is moved by the positioning device 140 relative to the spot 158. The positioning device 140 enables the end of the optical fiber 120 to be moved relative to the spot 158 until alignment is achieved as indicated by good coupling between the electrical signal into the laser and the optical signal out of the optical fiber.

In embodiments in which the optical module 106 is a receiver module, the optical path 150 will tilt as the emitting spot 158 on the end of fiber 120 is moved since the positioning device 140 moves the emitting spot 158 with respect to the frame and since lens 130 is fixed with respect to the frame. In this way, the location of the spot 152 at which light is incident on the optical detector can be adjusted by the positioning device 140. The positioning device 140 enables the spot 152 to be moved across the detector until alignment is achieved as indicated by good coupling between the optical signal into the fiber 120 and the electrical signal generated by the detector.

In many applications, alignment is achieved with a positioning device 140 that is capable of moving a stage in two transverse, but preferably orthogonal, directions. In applications in which movement in two transverse directions is desirable, it is possible to provide the function of the two-directional positioning device using two one-directional positioning devices. The positioning function performed by positioning device 140 (assumed to require two direction positioning) in the embodiments depicted in FIGS. 1–4, is performed by two one-directional positioning devices, denoted 240 and 241 in the embodiments depicted in FIGS. 5–7. Arrangements in which the positioning device 140 in the embodiments of FIGS. 1–4 moves a stage in two transverse, but not necessarily orthogonal, directions, the same function is achieved by two positioning devices, 240 and 241, each capable of moving a stage in only one direction, but in which the two one-directional positioning devices 240, 241 are aligned to provide a composite movement of a stage along the two transverse directions. These alternative embodiments are discussed with respect to FIGS. 5–7.

Figure 5:
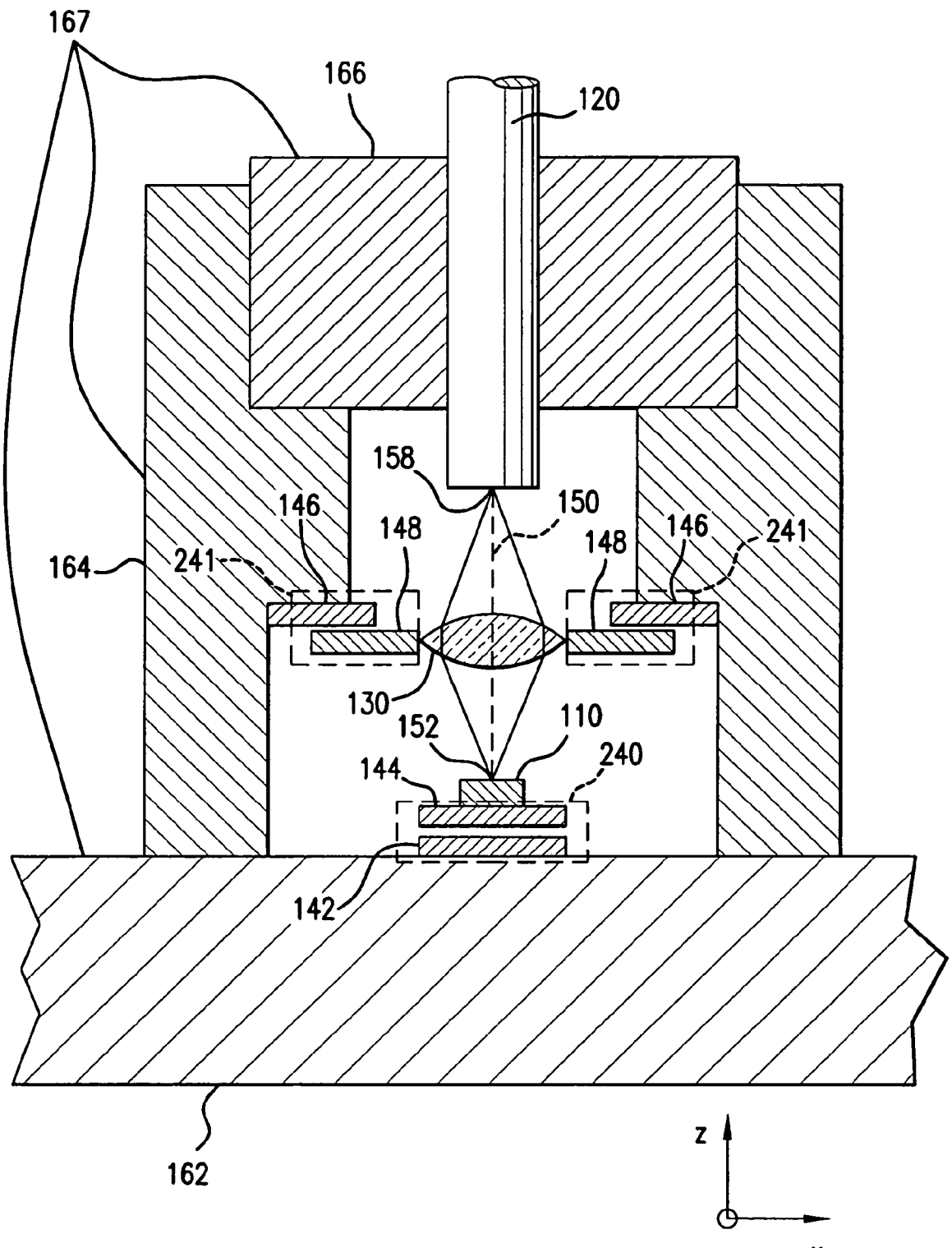

In yet another example depicted in FIG. 5 of the embodiment of an optical transmitter module, an optical receiver module, or an optical transceiver module, the optical module includes a frame to which the optical fiber 120 is affixed. The first and second micro-machined movable stages 240, 241 constitute the positioning device. The first micro-machined movable stage 240 is affixed between the frame and the active optical component 110, and the second micro-machined movable stage 241 is affixed between the frame and the beam shaping optical component 130.

Figure 6:
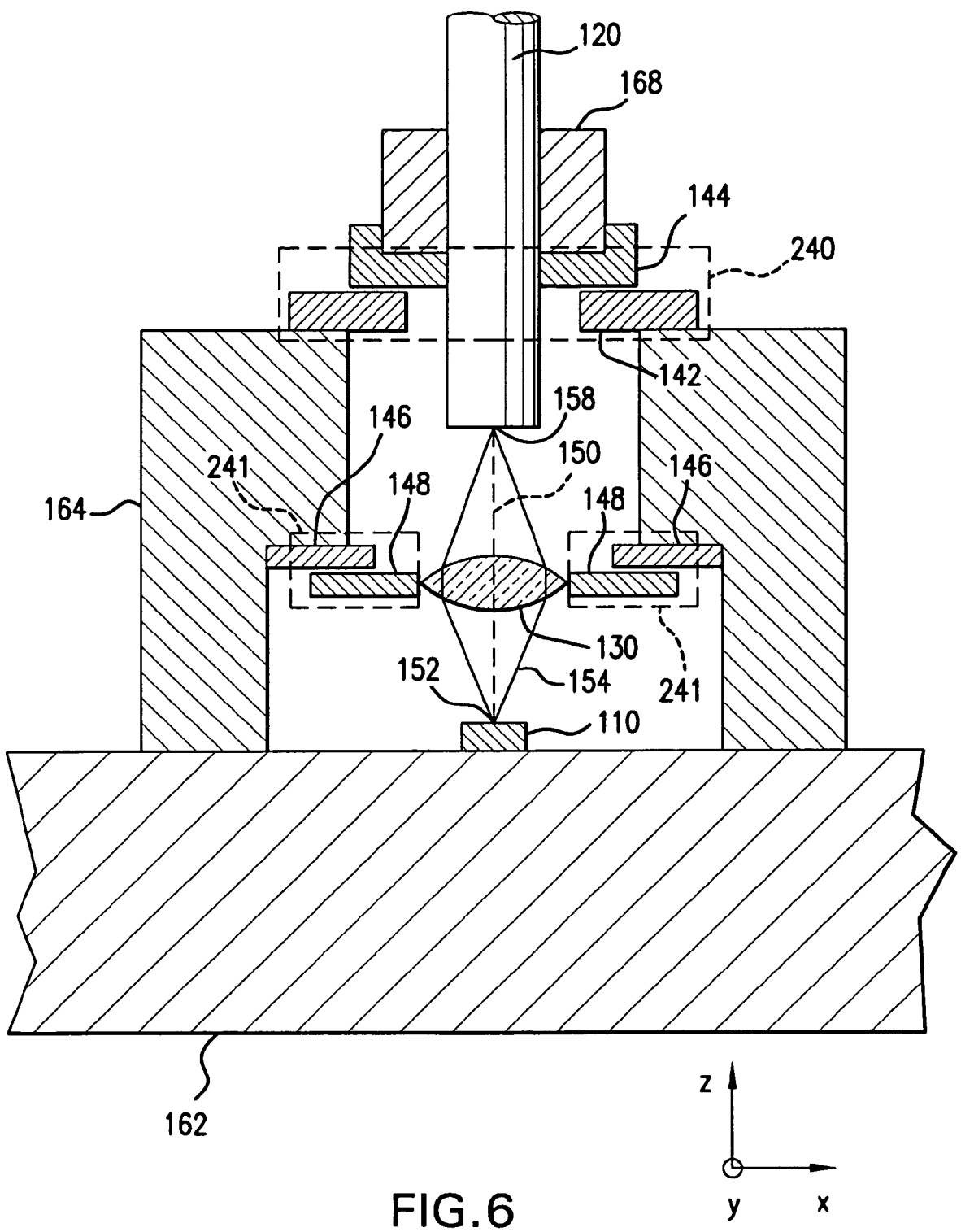

In yet another example depicted in FIG. 6 of the embodiment of an optical transmitter module, an optical receiver module, or an optical transceiver module, the optical module includes a frame to which the active optical component 110 is affixed. The first and second micro-machined movable stages 240, 241 constitutes the positioning device. The first micro-machined movable stage 240 is affixed between the frame and the optical fiber 120, and the second micro-machined movable stage 241 is affixed between the frame and the beam shaping optical component 130.

Figure 7:
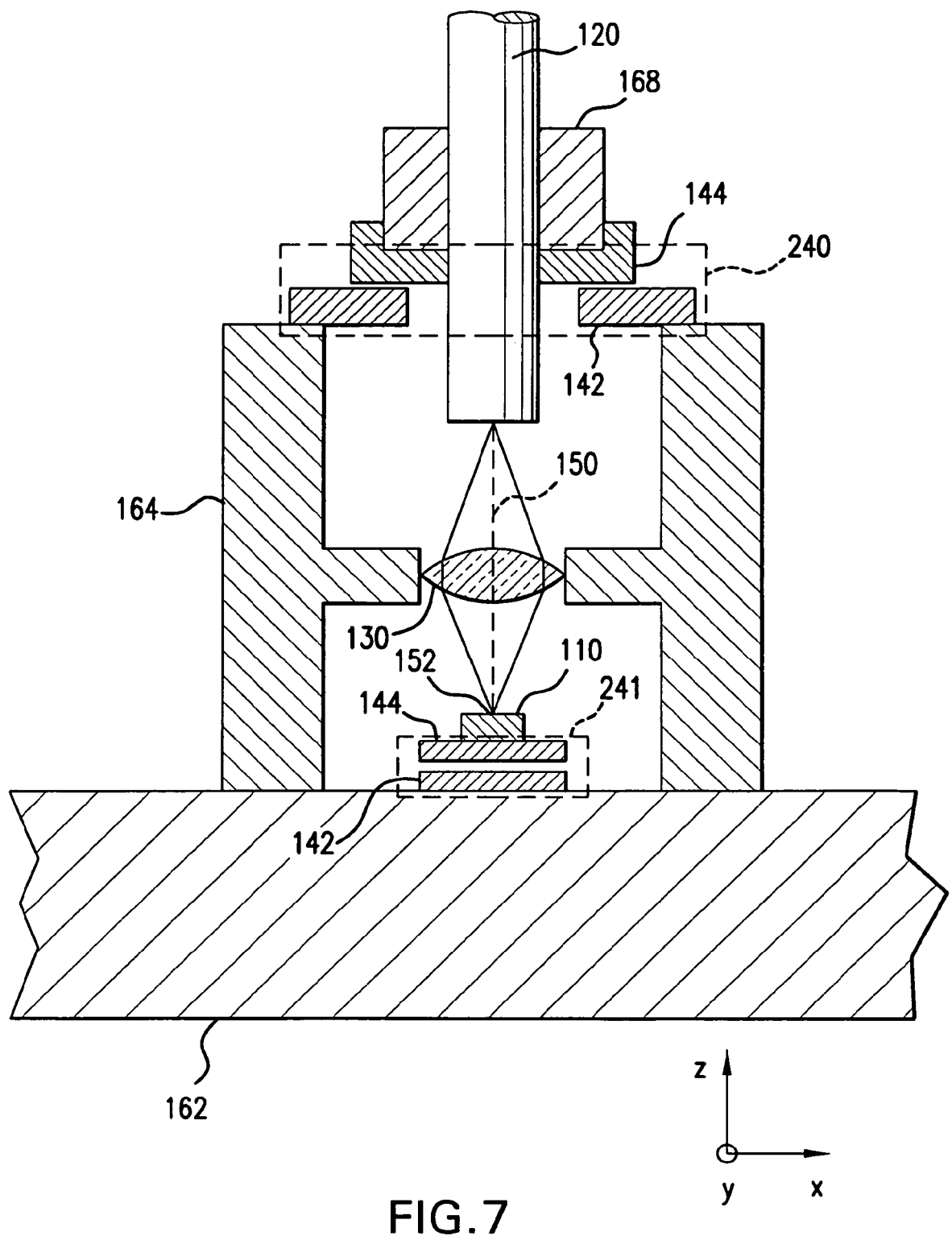

In yet another example depicted in FIG. 7 of the embodiment of an optical transmitter module, an optical receiver module, or an optical transceiver module, the optical module includes a frame to which the beam shaping optical component 130 is affixed. The first and second micro-machined movable stages 240, 241 constitutes the positioning device. The first micro-machined movable stage 241 is affixed between the frame and the active optical component 110, and the second micro-machined movable stage 240 is affixed between the frame and the optical fiber 120.

Yet another embodiment of the invention is depicted as optical module 201 in FIG. 8A. Optical module 201 includes an optical module 100 that may be any one of the optical module embodiments described above. However, in this embodiment, solder, adhesive or equivalent is coated on the facing surfaces of the moving parts of the micro-machined movable stage used in the positioning device 140 as described below. During an alignment process, optical module 201 is optically and electrically connected to an alignment system 220. More specifically, the optical module 100 communicates with alignment system 220 over optical fiber 120 and an electrical connection 206 which is connected to the active optical component 110 in optical module 100. Alignment system 220 provides the positioning device 140 with drive signals over electrical connections 222. The positioning device is capable of moving one of a pair of elements with respect to the other after alignment and before their relative positions are fixed as discussed below. The pair of elements includes any one of:

(a) the beam shaping optical component and the optical fiber, (b) the beam shaping optical component and the active optical component, and (c) the active optical component with respect to the optical fiber.

In an exemplary alignment process, alignment system 220 causes the positioning device 140 to execute a scanning movement while monitoring the relationship between light intensity in the optical fiber 120 and the level of the electrical signal in the electrical connection 206. After scanning over a predetermined range, a position of maximum coupling is determined, the alignment system sends positioning signals to cause the positioning device to move to the position of maximum coupling, and the alignment system sends a signal over connections 222 to immobilize the positioning device 140 as discussed below at the position of maximum coupling. In this way, the optical module 100 moves the positioning device 140 to a position of maximum signal coupling between the optical fiber 120 and electrical connection 206 and is then rendered immobile. In a process referred to as fixation of position, the solder, adhesive or equivalent is activated to hold the one of the pair of elements in position with respect to the other.

After the optical module is assembled, and then properly aligned, the solder is melted and allowed to cool, or the adhesive is activated, or some other equivalent fixation device is activated to the one of the pair of elements fixed in position with respect to the other.

Figure 9:
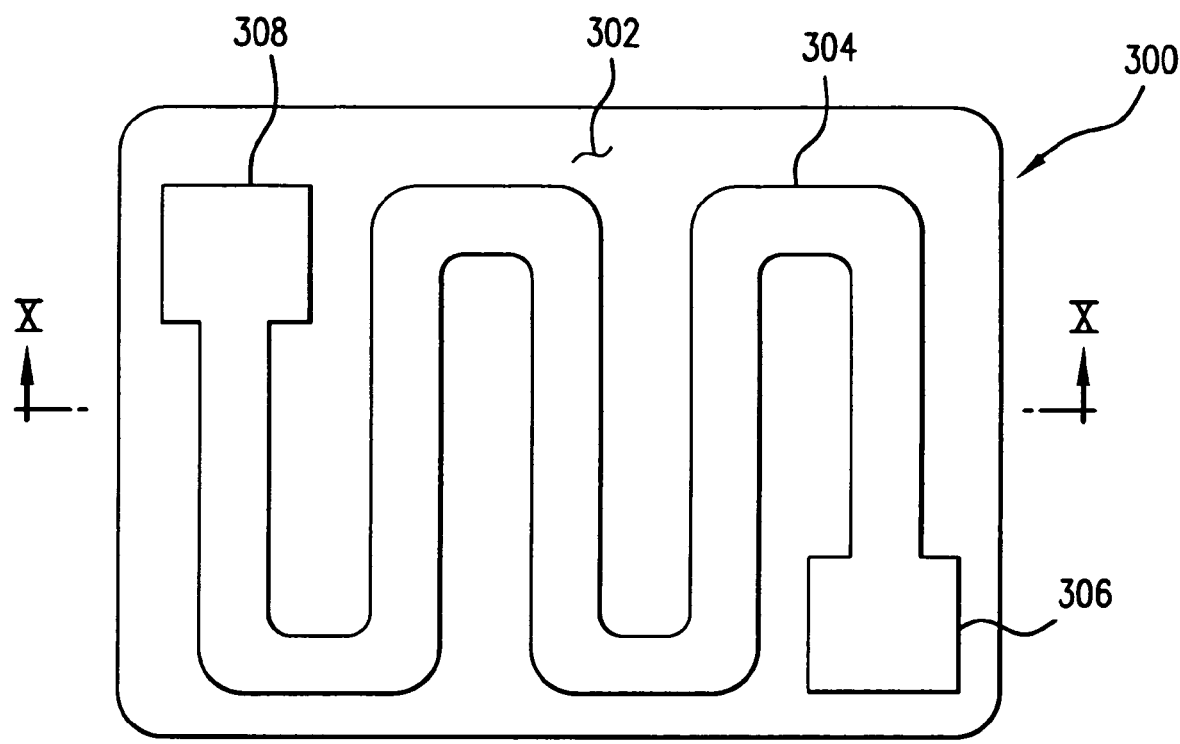
FIG. 9 is a plan view of a micro heater according to an embodiment of the present invention.
Figure 10:
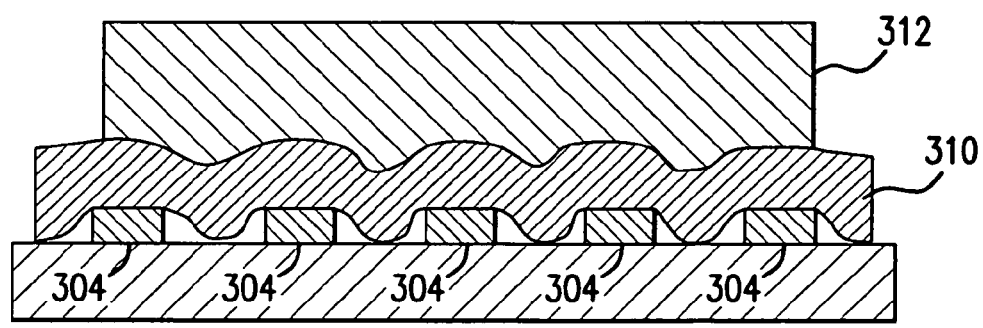
FIG. 10 is a section view through the micro heater of FIG. 9.

In the case of solder, a micro heating element 300 (see FIG. 9) is located on the surface 302 of the moving parts of the micro-machined movable stage used in the positioning device. In FIGS. 9 and 10, the heating element includes a meander line 304 of a material having electrical resistance to convert electrical current into heat. Meander line 304 is connected between heater terminals 306, 308. However, other heater element designs may be used. For example, micro-heating elements from the art of bubble jet printer technology might be used. On top of the heater meander line 304 is an electrical insulator 310, and on top of insulator 310 over the meander line 304 is a layer of solder 312 that when melted and allowed to solidify holds the one of the pair of elements fixed in position with respect to the other. Current passed through the meander line heats the solder to its melting point. The positioning device may includes two such heating elements 300 and layers of solder 312. The two heating elements are located opposite one another on facing surfaces of the micro machined moveable stage. When both heater elements are activated, the solder on each melts and flows to form an integral mass with the other. After the current is discontinued, the solder cools and freezes. This holds the one of the pair of elements fixed in position with respect to the other.

In another embodiment, the adhesive is a heat-activated adhesive. In the case of a heat activated adhesive, a micro heating element 300 (see FIG. 9), similar to that described above and used for solder, is located on the surface 302 of each of the moving parts of the micro-machined movable stage used in the positioning device. The heat-activated adhesive is applied over the heating element. In this embodiment, the adhesive holds the one of the pair of elements fixed in position with respect to the other.

Alternatively, the adhesive is activated by exposure to infrared radiation, ultraviolet radiation or RF radiation. In the case of infrared radiation, the optical module has apertures located to provide for the passage of the infrared radiation or the positioning device is heated as a mass to a temperature low enough to not effect the performance of the module, but high enough to cure the adhesive over time. In the case of ultraviolet radiation, the optical module has apertures located to provide for the passage of the ultraviolet radiation. RF radiation may be propagated through passages as with ultraviolet radiation, or alternatively, may be coupled through a wire in the optical module to radiate from a small RF radiator (e.g., a patch) on a surface of the moving parts of the micro-machined movable stage used in the positioning device in the same way that heating meander line 304 is located on the surface 302. Furthermore, heat activated adhesives and solders are not limited to activation by heating element 300. Strong infrared radiation may be directed through apertures located in the optical module to provide a passage for the infrared radiation to reach the heat activated adhesive or solder.

Figure 8B:
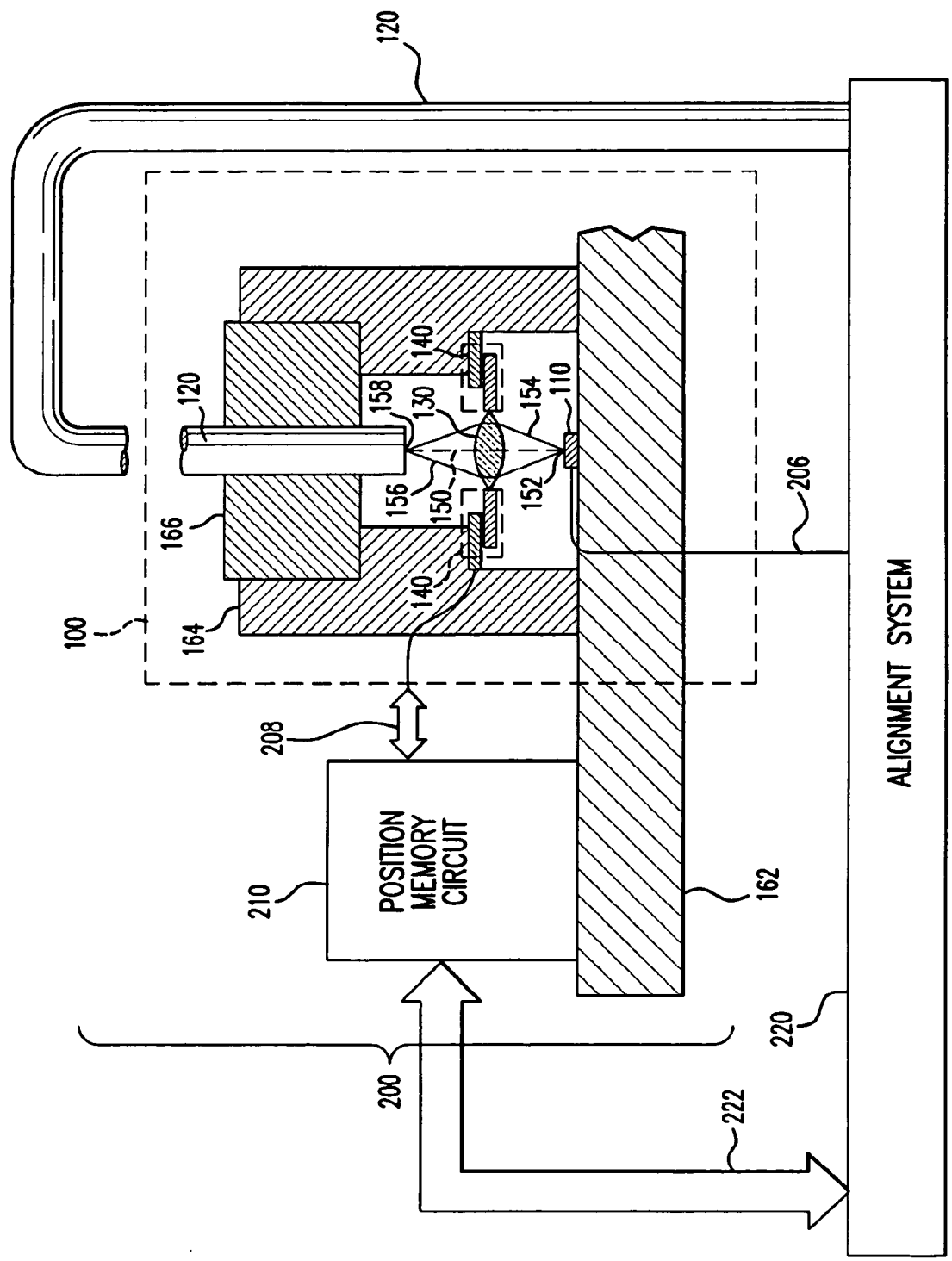
FIG. 8B is a schematic diagram of an alternative embodiment of an optical module that includes a position memory circuit according to the present invention.

Yet another embodiment of the invention is depicted as optical module 200 in FIG. 8B. Optical module 200 includes a position memory circuit 210 that is electrically connected by electrical connections 208 to an optical module 100 that may be any one of the optical module embodiments described above. During an alignment process, optical module 200 is optically and electrically connected to an alignment system 220. More specifically, the optical module 100 communicates with alignment system 220 over optical fiber 120 and an electrical connection 206 which is connected to the active optical component 110 in optical module 100. When optical module 100 is configured as an optical receiver module, electrical connection 206 sends electrical signals from the active optical component 110 to the alignment system 220 in response to optical signals received over fiber 120. When optical module 100 is configured as an optical transmitter module, electrical connection 206 sends electrical drive signals from the alignment system 220 to the active optical component 110 to produce optical signal over fiber 120. In optical module 100, the positioning device 140 is controlled by the position memory circuit 210 which provides control signals over electrical connections 208. Position memory circuit 210 is controlled by, and may send status signals back to, the alignment system 220 over electrical connections 222. Although FIG. 8B depicts module 200 as including optical module 100, any optical module discussed with reference to any of FIGS. 1–7 may be included in module 200 in place of the optical module 100.

Position memory circuit 210 provides electrical drive signals to the positioning device 140 over control connections 208 according to control signals received from an alignment system 220 over control connections 222. The position memory circuit 210 operates in at least two operational modes: alignment and parameter retention. The operational mode of the position memory circuit is determined by a signal received over control connections 222 from the alignment system 220.

When the position memory circuit is in the alignment mode, alignment system 220 provides positioning signals over connections 222 to the position memory circuit 210, and the position memory circuit 210 provides the positioning signals over the connections 208 to the optical module 100.

In an exemplary alignment process, alignment system 220 causes the position memory circuit 210 to be in the alignment mode and causes the positioning device 140 to execute a scanning movement. While causing the positioning device 140 to execute the scanning movement, the alignment system 220 monitors the relationship between light intensity in the optical fiber 120 and the level of the electrical signal in the electrical connection 206. After scanning over a predetermined range, a position of maximum coupling is determined, the alignment system sends positioning signals to cause the positioning device to move to the position of maximum coupling, and the alignment system sends a signal over connections 222 to place the position memory circuit in the parameter retention mode. In the parameter retention mode, the position memory circuit stores in a memory the positioning signals that caused the positioning device to be moved to the position of maximum coupling.

The alignment system 220 is then disconnected from the optical module 200, and the position memory circuit 210 continues to send the positioning signals over connections 208 that cause the positioning device to move to the position of maximum coupling. In this way, and other equivalent ways, the position memory circuit is operable to control the positioning device to control movement of at least one of the beam shaping optical component with respect to the optical fiber, the beam shaping optical component with respect to the active optical component, and the active optical component with respect to the optical fiber. Thereafter, whenever the optical module is powered, the position memory sends signals to the positioning device to hold the one of the pair of elements in position with respect to the other.

In a variation of this example, the positioning device 140 includes electric proximity detectors to provide position feedback signals from the positioning device 140 to the position memory circuit 210. In this way, a closed loop position feedback signal is to the position memory circuit to mechanize a servo and ensure that the position of the positioning device stays stable with respect to vibrations or other environment changes imposed on optical module 100.

In an example of the position memory circuit, the circuit 210 is implemented in an integrated circuit chip. One possible location for the integrated circuit chip is on substrate 162 as depicted schematically in FIG. 8B. Substrate 162 may include, but does not need to include, connections that connect the active optical component 110 to the connection 206. Of course, there may be additional bonding wires from, for example, the active optical component or the position memory circuit or both, to, for example, the conductors in the substrate. The position memory circuit may be implemented out of an application specific integrated circuit (ASIC), gate arrays (e.g., FPGA), microprocessor, or other equivalent technologies. Alternatively, the position memory circuit may be implemented out of discrete components or a combination of discrete components. The position memory circuit includes a memory device to store the position signals that control the positioning device when operating in the parameter retention mode. The memory device may be of most any technology (e.g., DRAM, SRAM, etc.), but preferably is of non-volatile technology such as a commonly used a flash memory or a memory using fused link programmable arrays. The non-volatile memory has the advantage that it will store the position signals when electrical power is removed from the position memory circuit. This constitutes and example of fixation of the position.

The optical module 200 is made by assembling the position memory circuit with the assembly 202 of the active optical component, the beam shaping optical component, the positioning device and the frame as described with respect to any of the embodiments discussed with respect to FIGS. 1–7. The positioning device is capable of moving one of a pair of elements with respect to the other before their relative positions are fixed as discussed below. The pair of elements includes one of:

(a) the beam shaping optical component and the optical fiber, (b) the beam shaping optical component and the active optical component, and (c) the active optical component with respect to the optical fiber.

The optical module is aligned to move the positioning device to a position of maximum signal coupling between the optical fiber 120 and electrical connection 206. Then, in a process referred to as fixation of position, the position memory circuit is placed in a parameter retention mode so that, in operation, the one of the pair of elements is held in position with respect to the other.

Having described preferred embodiments of a novel optical module, it is noted that modifications and variations can be made in light of the above teachings. It is therefore to be understood that changes may be made in the particular embodiments of the invention disclosed which are within the scope of the invention as defined by the appended claims.

What is claimed is:

1. An optical module comprising:

an active optical component;

an optical fiber arranged with respect to the active optical component to be capable of propagating light along an optical path between the active optical component and the optical fiber;

a beam shaping optical component located in the optical path between the optical fiber and the active optical component;

a positioning device for moving at least one of the beam shaping optical component with respect to the optical fiber, the beam shaping optical component with respect to the active optical component, and the active optical component with respect to the optical fiber; and a frame to which the optical fiber is affixed, wherein the positioning device comprises a first micro-machined movable stage affixed between the frame and the active optical component, and the positioning device additionally comprises a second micro-machined movable stage affixed between the frame and the beam shaping optical component.

2. An optical module comprising:

an active optical component;

an optical fiber arranged with respect to the active optical component to be capable of propagating light along an optical path between the active optical component and the optical fiber;

a beam shaping optical component located in the optical path between the optical fiber and the active optical component;

a positioning device for moving at least one of the beam shaping optical component with respect to the optical fiber, the beam shaping optical component with respect to the active optical component, and the active optical component with respect to the optical fiber; and a frame to which the optical fiber is affixed, wherein the positioning device comprises a first micro-machined movable stage affixed between the frame and the optical fiber and movable in a first direction, and the positioning device additionally comprises a second micro-machined movable stage affixed between the frame and the beam shaping optical component and movable in a second direction transverse to the first direction.

3. An optical module comprising:

an active optical component;

an optical fiber arranged with respect to the active optical component to be capable of propagating light along an optical path between the active optical component and the optical fiber;

a beam shaping optical component located in the optical path between the optical fiber and the active optical component;

a positioning device for at least one moving of the beam shaping optical component with respect to the optical fiber, moving the beam shaping optical component with respect to the active optical component, and moving the active optical component with respect to the optical fiber; and a frame to which the optical fiber is affixed, wherein the positioning device comprises a first micro-machined movable stage affixed between the frame and the active optical component, and the positioning device additionally comprises a second micro-machined movable stage affixed between the frame and the optical fiber.

4. An optical module comprising:

an active optical component;

an optical fiber arranged with respect to the active optical component to be capable of propagating light along an optical path between the active optical component and the optical fiber;

a beam shaping optical component located in the optical path between the optical fiber and the active optical component;

a positioning device for at least one of moving of the beam shaping optical component with respect to the optical fiber, moving the beam shaping optical component with respect to the active optical component, and moving the active optical component with respect to the optical fiber; and means for holding the positioning device in position while the optical module is uncoupled from any alignment system, wherein the means for holding comprises a position memory circuit operable to control the positioning device.

5. An optical module comprising:

an active optical component;

an optical fiber arranged with respect to the active optical component to be capable of propagating light along an optical path between the active optical component and the optical fiber;

a beam shaping optical component located in the optical path between the optical fiber and the active optical component;

a positioning device for moving at least one of the beam shaping optical component with respect to the optical fiber, the beam shaping optical component with respect to the active optical component, and the active optical component with respect to the optical fiber; and means for holding the positioning device in position, wherein the means for holding comprises an adhesive and a micro heater located on the positioning device capable of activating the adhesive.

6. An optical module according to claim 5, wherein the optical module is separable from any alignment system.

7. An optical module according to claim 5, wherein the adhesive is capable of irreversibly binding the positioning device in position after the adhesive is activated by the micro heater.

8. An optical module comprising:

an active optical component;

an optical fiber arranged with respect to the active optical component to be capable of propagating light along an optical path between the active optical component and the optical fiber;

a beam shaping optical component located in the optical path between the optical fiber and the active optical component;

a positioning device for at least one of moving of the beam shaping optical component with respect to the optical fiber, moving the beam shaping optical component with respect to the active optical component, and moving the active optical component with respect to the optical fiber; and means for holding the positioning device in position while the optical module is uncoupled from any alignment system, wherein the means for holding comprises a position memory circuit operable to control the positioning device.

9. A method of making an optical module comprising:

assembling in the optical module a position memory circuit, an active optical component, an optical fiber arranged with respect to the active optical component to be capable of propagating light along an optical path between the active optical component and the optical fiber, a beam shaping optical component located in the optical path between the optical fiber and the active optical component, and a positioning device capable of moving one of a pair of elements with respect to the other, the pair of elements comprising one of (a) the beam shaping optical component and the optical fiber, (b) the beam shaping optical component and the active optical component and (c) the active optical component with respect to the optical fiber;

aligning to maximize coupling between the optical fiber and the active optical component; and storing alignment data in the position memory circuit so that the optical module is capable of positioning the positioning device according to the position memory circuit after the optical module is uncoupled from any alignment system.

* * * * *